US008694419B2

(12) United States Patent
Malackowski et al.

(10) Patent No.: US 8,694,419 B2
(45) Date of Patent: Apr. 8, 2014

(54) METHODS AND SYSTEMS FOR UTILIZING INTELLECTUAL PROPERTY ASSETS AND RIGHTS

(75) Inventors: James E. Malackowski, Chicago, IL (US); Robert Block, Chicago, IL (US); Andrew Carter, Chicaco, IL (US); Mark Rubin, Chicago, IL (US)

(73) Assignee: Ocean Tomo, LLC, Greenwich, CT (US)

( * ) Notice: Subject to any disclaimer, the term of this patent is extended or adjusted under 35 U.S.C. 154(b) by 265 days.

(21) Appl. No.: 12/398,836

(22) Filed: Mar. 5, 2009

(65) Prior Publication Data

US 2009/0234781 A1      Sep. 17, 2009

Related U.S. Application Data

(63) Continuation-in-part of application No. 10/718,041, filed on Nov. 18, 2003, now abandoned, and a continuation-in-part of application No. 11/292,728, filed on Dec. 1, 2005, now abandoned.

(51) Int. Cl.
*G06Q 40/00* (2012.01)
(52) U.S. Cl.
USPC .............................. 705/38; 705/36
(58) Field of Classification Search
USPC ........................................................ 705/38
See application file for complete search history.

(56) References Cited

U.S. PATENT DOCUMENTS

| | | | |
|---|---|---|---|
| 5,594,897 A | 1/1997 | Goffman | |
| 5,721,910 A | 2/1998 | Unger et al. | |
| 5,832,494 A | 11/1998 | Egger et al. | |
| 5,999,907 A | 12/1999 | Donner | |
| 6,018,714 A | 1/2000 | Risen et al. | |
| 6,038,561 A | 3/2000 | Snyder et al. | |
| 6,154,725 A | 11/2000 | Donner | |
| 6,175,824 B1 | 1/2001 | Breitzman et al. | |

(Continued)

FOREIGN PATENT DOCUMENTS

| | | |
|---|---|---|
| WO | WO 00/75851 | 5/2000 |
| WO | WO 01/52097 | 7/2001 |

OTHER PUBLICATIONS

Elliott Doulas R,; Method of Repeatedly Securitizing Intellectual Property Assets and Facilitating Investments Therein; Jan. 11, 2000; WIPO/Thomson; 24/3,K/6 (Item 6 from file: 349).*

(Continued)

*Primary Examiner* — Ella Colbert
*Assistant Examiner* — Michael Cranford
(74) *Attorney, Agent, or Firm* — Knobbe, Martens, Olson & Bear LLP

(57) ABSTRACT

A method of utilizing an intellectual property grouping owned by a patent entity to generate income. The method includes acquiring rights in a first intellectual property asset from a seller on behalf of a patent investment entity, providing compensation to the seller in exchange for the first intellectual property asset, granting less than all of the rights in the first intellectual property asset to the seller of the intellectual property asset in exchange for a stream of payments, wherein granting less than all of the rights in the first intellectual property asset creates residual rights in the first intellectual property asset, and utilizing the residual rights in the first intellectual property asset to generate income for the patent investment entity.

46 Claims, 3 Drawing Sheets

(56) References Cited

U.S. PATENT DOCUMENTS

| | | | |
|---|---|---|---|
| 6,202,058 B1 | 3/2001 | Rose et al. | |
| 6,263,314 B1 | 7/2001 | Donner | |
| 6,269,349 B1 | 7/2001 | Aieta et al. | |
| 6,286,018 B1 | 9/2001 | Pitkow et al. | |
| 6,330,547 B1 | 12/2001 | Martin | |
| 6,389,418 B1 | 5/2002 | Boyack et al. | |
| 6,499,026 B1 | 12/2002 | Rivette et al. | |
| 6,556,992 B1 | 4/2003 | Barney et al. | |
| 6,604,114 B1 | 8/2003 | Toong et al. | |
| 6,799,176 B1 | 9/2004 | Page | |
| 6,832,211 B1 | 12/2004 | Thomas et al. | |
| 7,188,069 B2 | 3/2007 | Hagelin | |
| 7,213,198 B1 | 5/2007 | Harik | |
| 7,228,288 B2* | 6/2007 | Elliott | 705/35 |
| 7,236,953 B1 | 6/2007 | Cooper et al. | |
| 7,292,994 B2 | 11/2007 | Prokoski | |
| 7,315,836 B1 | 1/2008 | Elliott et al. | |
| 7,451,388 B1 | 11/2008 | Henzinger et al. | |
| 7,912,842 B1 | 3/2011 | Bayliss | |
| 2001/0034686 A1 | 10/2001 | Eder | |
| 2001/0044734 A1 | 11/2001 | Walker et al. | |
| 2002/0002523 A1* | 1/2002 | Kossovsky et al. | 705/35 |
| 2002/0035499 A1 | 3/2002 | Germeraad et al. | |
| 2002/0046038 A1 | 4/2002 | Prokoski | |
| 2002/0077835 A1 | 6/2002 | Hagelin | |
| 2002/0077870 A1 | 6/2002 | Wilkinson | |
| 2002/0082778 A1 | 6/2002 | Barnett et al. | |
| 2002/0099637 A1 | 7/2002 | Wilkinson et al. | |
| 2002/0116211 A1* | 8/2002 | Hatakeyama | 705/1 |
| 2002/0156760 A1 | 10/2002 | Lawrence et al. | |
| 2003/0036945 A1 | 2/2003 | Del Vecchio et al. | |
| 2003/0061133 A1* | 3/2003 | Nutter et al. | 705/30 |
| 2003/0065658 A1 | 4/2003 | Matsubayashi et al. | |
| 2003/0126054 A1 | 7/2003 | Purcell, Jr. | |
| 2003/0139988 A1* | 7/2003 | Clarkson | 705/35 |
| 2003/0149588 A1* | 8/2003 | Joao | 705/1 |
| 2003/0177071 A1 | 9/2003 | Treese et al. | |
| 2003/0212572 A1 | 11/2003 | Poltorak | |
| 2003/0225653 A1 | 12/2003 | Pullman | |
| 2004/0010393 A1 | 1/2004 | Barney | |
| 2004/0068453 A1 | 4/2004 | Duan et al. | |
| 2004/0103112 A1 | 5/2004 | Colson et al. | |
| 2004/0122841 A1 | 6/2004 | Goodman et al. | |
| 2004/0133433 A1 | 7/2004 | Lee et al. | |
| 2004/0158473 A1* | 8/2004 | Contractor | 705/1 |
| 2004/0220842 A1* | 11/2004 | Barney | 705/7 |
| 2005/0021434 A1 | 1/2005 | D'Loren | |
| 2005/0071174 A1 | 3/2005 | Leibowitz et al. | |
| 2005/0137913 A1 | 6/2005 | Laning et al. | |
| 2005/0149401 A1 | 7/2005 | Ratcliffe et al. | |
| 2005/0149420 A1 | 7/2005 | Hagelin | |
| 2006/0036452 A1 | 2/2006 | Williams | |
| 2006/0036453 A1 | 2/2006 | Williams | |
| 2006/0036529 A1 | 2/2006 | Williams | |
| 2006/0036632 A1 | 2/2006 | Williams | |
| 2006/0036635 A1 | 2/2006 | Williams | |
| 2006/0074867 A1 | 4/2006 | Breitzman | |
| 2006/0224999 A1 | 10/2006 | Albrecht et al. | |
| 2007/0073625 A1 | 3/2007 | Shelton | |
| 2007/0073748 A1 | 3/2007 | Barney | |
| 2007/0088738 A1 | 4/2007 | Barney | |
| 2007/0094297 A1 | 4/2007 | Barney | |
| 2007/0150298 A1 | 6/2007 | Barney | |
| 2007/0208669 A1 | 9/2007 | Rivette et al. | |
| 2008/0091620 A1 | 4/2008 | Vollenweider et al. | |

OTHER PUBLICATIONS

Lasinski Michael J,; Intellectual Property Trading Exchange; Nov. 30, 2010; WIPO/Thomson; 12/5/2 (Item 2 from file: 349).*
Malackowski James E,; Intellectual Property Trading Exchange; Mar. 29, 2010; WIPO/Thomson; 12/5/1 (Item 1 from file: 349).*
A Beeline Bonding, 2005, http://www.beelinebonding.com/faqs.htm.
Albert, et al.: "Direct Validation of Citation Counts as Indicators of Industrially Important Patents", Research Policy, vol. 20, 1991, pp. 251-259.
Allison, et al.: "Empirical Evidence on the Validity of Litigated Patents", Jul. 1998. Available on SSRN: http://ssrn.com/abstract=118149 or DOI: 10.2139/ssrn.118149.
Allison, et al.: "Valuable Patents", Boalt Working Papers in Public Law, Paper 28, 2003.
Barney, J.A.: "A Study of Patent Morality Rates: Using Statistical Survival Analysis to Rate and Value Patent Assets", AIPLA Quarterly Journal, vol. 30, No. 3, pp. 317-352.
Buchanan, J.M.: "Patent Rankings: The Numbers Game v. Patent Quality", blog post, downloaded from www.rethinkip.com, Apr. 20, 2005.
Chen et al.: "Trailblazing the Literature of Hypertext: Author Co-Citation Analysis (1989-1998)", Proceedings of the tenth ACM Conference, 1999, pp. 1-10, Download: www.portal.acm.org/citation.cfm?id=294469.294486.
Deng, et al.: "Science and Technology as Predictors of Stock Performance", Financial Analysis Journal, vol. 55, No. 3, May/Jun. 1999, pp. 20-32.
Garson, G.D.: "Multiple Regression," downloaded from faculty.chass.ncsu.edu/garson/PA765/regress.htm, Mar. 3, 2010.
Griliches, Z.: Patent Statistics as Economic Indicators: A Survey, Journal of Economic Literature, vol. 28, No. 4, Dec. 1990, pp. 1661-1707.
Hall, et al.: "Market Value and Patent Citations: A First Look", Proceedings of the Conference on Intangibles and Capital Markets, May 15-16, 1998.
Harhoff, et al.: "Citation Frequency and the Value of Patented Innovation", Discussion paper 97-27, Aug. 1997.
Harhoff, et al.: "Citations, Family Size, Opposition and the Value of Patent Rights", downloaded from http://elsa.berkeley.edu/bhhall/harhoffeta199.pdf, Sep. 1999.
Hirschey, et al.: "Value Relevance of Nonfinancial Information: The Case of Patent Data", Available at SSRN: http://ssrn.com/abstract=63589, Aug. 9, 1998.
Hou, et al.: "A Multiple Regression Model for Patent Appraisal", Industrial Management & Data Systems, vol. 106, No. 9, 2006, pp. 1304-1332.
Kim, et al.: "Patent Litigation Risk-Scoring Model", Proceedings of the 2002 IEEE Systems and Information Design Symposium, 2002, pp. 13-17.
King, Alfred M.: "Valuing Intangible Assets through Appraisals", Strategic Finance, Nov. 1999, p. 32, retrieved from Proquest Oct. 24, 2008.
Kohonen, et al.: "Self Organization of a Massive Document Collection", IEEE Transactions on Neural Networks, vol. 11, No. 3, May 2000, pp. 574-585.
Lanjouw, et al.: "Characteristics of Patent Litigation: A Window on Competition", RAND Journal of Economics, vol. 32, No. 1, Spring 2001, pp. 129-151.
Lanjouw, et al.: "How to Count Patents and Value Intellectual Property: The Uses of Patent Renewal and Application Data", NBER Working Paper 5741, Sep. 1996.
Lanjouw, et al.: "How to Count Patents and Value Intellectual Property: The Uses of Patent Renewal and Application Data", The Journal of Industrial Economics, vol. 46, No. 4, Dec. 1998, pp. 405-432.
Lanjouw, et al.: "Stylized Facts of Patent Litigation", slideshow, presentation at the National Academy of Sciences Board on Science, Technology and Economic Policy (STEP) Conference, Feb. 2-3, 2000.
Lanjouw, et al.: "Stylized Facts of Patent Litigation: Value, Scope and Ownership", NBER Working Paper 6297, Dec. 1997.
Markoff, John: "Company News; Newest Chip from Intel Will B e Hard to Copy", New York Times, (Late Edition [East Coast]). New York, NY, Mar. 23, 1993, p. D4.
McCormack, R.L.: "A Comparison of Three Predictor Selection Techniques in Multiple Regression", Psychometrika, vol. 35, No. 2, Jun. 1970, pp. 257-271.
Narin, F.: "Tech-Line Background Paper", CHI Research, Inc. Aug. 19, 1998.

(56) References Cited

OTHER PUBLICATIONS

Neilfeld, R.A.: "A Macro-Economic Model Providing Patent Valuation and Patent Based Company Financial Indicators", JPTOS, vol. 83, No. 3, Mar. 2001, pp. 211-222.

Neilfeld, R.A.: "Patent Valuation from a Practical View Point, and Some Interesting Patent Value Statistics form the PatentValuePredictor Model", PatentCafe Magazine, downloaded from www.PatentCare.com, Apr. 14, 2004.

Parchomovsky, et al.: "Patent Portofolios", University of Pennsylvania Law Review, vol. 154, No. 1, Nov. 2005. Available at SSRN: http://ssrn.com/abstract=874445 or DOI: 10.2139/ssrn.582201.

Pitkethly, R.: "The Valuation of Patents: A Review of Patent Valuation Methods with Consideration of Option Based Methods and the Potential for Further Research", Judge Institute Working Paper WP 12/97, 1997.

Pr Newswire. CoBiz Inc. To Acquire Alexander Capital Management Group. PR Newswire, New York: Dec. 23, 2002, p. 1.

Putman, J.D.: "The Value of International Patent Rights", Ph.D. dissertation, Yale University, May 1996.

Rabbino, Stacey: "Rules for Managing IP after Enron", Managing Intellectual Property, Nov. 2003, Issue 134, p. 62-64.

Reitzig, M.: "Improving Patent Valuation Methods for Management—Validating New Indicators by Understanding Patenting Strategies", Job Talk Paper, downloaded from http://faculty.haas.berkeley.edu/reitzig/Validating_Indicators_010926, Oct. 26, 2001.

Schankerman, et al.: "Estimates of the Value of Patent Rights in European Countries During the Post-1950 Period", NBER Working Paper No. 1650, Jun. 1985.

Somers, Jeffrey P.: "Biotech Patent Licensing: Key Considerations in Deal Negotiations", Journal of Biolaw and Business, vol. 6, No. 3, 2003.

Thomas, P.: "The Effect of Techological Impact upon Patent Renewal Decisions", Technology Analysis & Strategic Management, vol. II, No. 2, 1999, pp. 181-197.

Trajtenberg, M.: "A Panny for Your Quotes: Patent Citations and the Value of Innovations", RAND Journal of Economics, vol. 21, No. 1, Spring 1990, pp. 172-181.

van der Drift, J.: "Statistics of European Patents on Legal Status and Granting Data", World Patent Information, vol. 10, No. 4, May 3-5, 1988, pp. 243-249.

Winkless, et al.: "Invention Quality Measurement (IQM) 1. Patent Valuation: The Methods that TRIZ Forgot", The TRIZ Journal, downloaded from www.triz-journal.com, Sep. 2003.

Janice Burns, Search Report, Scientific and Technical Information Center, EIC 3600, STIC Database Tracking No. 419684, Apr. 11, 2013, pp. 1-117.

\* cited by examiner

METHODS AND SYSTEMS FOR UTILIZING INTELLECTUAL PROPERTY ASSETS AND RIGHTS

CROSS-REFERENCE TO RELATED APPLICATIONS

The present application is a continuation-in-part of U.S. application Ser. No. 10/718,041 filed on Nov. 18, 2003 now abandoned and a continuation-in-part of U.S. application Ser. No. 11/292,728 filed on Dec. 1, 2005 now abandoned, the entire contents of each of which are incorporated by reference herein.

BACKGROUND

The present application relates to methods of securitizing and/or monetizing assets to obtain benefits associated with the transaction. In particular, the present application relates to methods of creating a patent investment entity to facilitate the securitizing and/or monetizing of intellectual property (IP) to obtain benefits associated with the securitizing and/or monetizing.

A securitization includes an assignable agreement having one or more specified future payments backed by rights sufficient to assure the parties purchasing the security that the payments will be made or title to property of similar value can be obtained. For example, in the case of a mortgage, the property interest is title to real estate. In the case of a sale/lease back, the property interest is the right of eviction. In the case of the securitization of intellectual property (IP) assets, discussed in more detail below, the property interest obtained in the event that the future payments are not made is the right to exclude others from the use of the subject matter of the IP. In each case, the party providing the capital has the ability to acquire a property interest that can be resold to others to provide a return on their original capital investment in the event that the specified future payments are not made according to the agreement.

Monetization may include the conversion of an asset or group of assets into some form of compensation, such as a lump sum payment, a stream of payments, etc. For example, licensing intellectual property in exchange for a stream of licensing payments monetizes the patent.

In the practice of accounting, it is well established that IP is "intangible property" that has no intrinsic value per se, but is merely representative of the value of the discovery. As an incentive for R&D expenditures, R&D costs are fully deductible as an expense in the year the costs are incurred. Therefore, when R&D expenditures result in IP such as a patent, the "book value" of the patent is zero even though the value to the business may be large. However, during an acquisition of an entity that owns IP assets, it may be required that the IP asset receive a book value that is equivalent to the fair market value of the IP assets. Further, wherein the intellectual property is sold to another entity, the value received for that sale is recognized.

Some intellectual properties created as a consequence of R&D possess desirable characteristics that lend themselves to securitization and/or monetization. Patents are one such intellectual property. Patents entitle the owner to exclude others from practicing the invention covered by the patent. Another type of intellectual property is information described in writings and knowledge arising within a business which is: (a) not generally known by others; (b) is retained in secret, and (c) is disclosed to others only under covenants to retain such disclosed intellectual properties secret between and among the parties bound by such covenants (hereinafter referred to as "trade secrets" or "know how"). Copyrights are another form of IP that may be securitized. Copyrights provide an author the right to control reproduction of his intellectual creation, such as literary works, musical works, dramatic works, pictorial works, motion pictures, sound recordings and architectural works.

A characteristic of intellectual property assets is the right to license, lease, or otherwise convey rights to use or otherwise practice the useful art, in whole or in part, embodied in such intellectual properties (hereinafter referred to as "licensing"). The granting of these rights to a third party is usually made in return for some type of compensation. A further characteristic of intellectual property assets is the right to identify potential infringers of the intellectual property asset and to request or sue for payment of a reasonable rate based on the infringing use.

What is needed is an entity configured to allow a corporation to obtain favorable benefits based on the sale of an intellectual property asset to a patent investment entity and subsequent leasing of the intellectual property asset from the patent investment entity. What is further needed is a patent investment entity configured to generate income based upon residual rights obtained in the acquisition and leasing of intellectual property assets.

SUMMARY

One exemplary embodiment relates to a method of utilizing an intellectual property grouping owned by a patent entity to generate income. The method includes acquiring rights in a first intellectual property asset from a seller on behalf of a patent investment entity, providing compensation to the seller in exchange for the first intellectual property asset, granting less than all of the rights in the first intellectual property asset to the seller of the intellectual property asset in exchange for a stream of payments, wherein granting less than all of the rights in the first intellectual property asset creates residual rights in the first intellectual property asset, and utilizing the residual rights in the first intellectual property asset to generate income for the patent investment entity.

Another exemplary embodiment relates to a method of utilizing an intellectual property grouping owned by a patent entity to generate income. The method includes acquiring rights in a first and second intellectual property asset from at least one seller on behalf of a patent investment entity, providing compensation to each of the at least one seller in exchange for the first and second intellectual property assets, granting less than all of the rights in the first intellectual property asset to the sellers of the first and second intellectual property assets in exchange for a stream of payments, wherein granting less than all of the rights in the first and second intellectual property asset creates first and second residual rights in the first and second intellectual property assets, respectively, and utilizing the first and second residual rights in the first and second intellectual property asset to generate income for the patent investment entity Yet another exemplary embodiment relates to a patent investment entity configured to manage an intellectual property grouping to generate income. The patent investment entity includes an intellectual property grouping, including at least one residual right in a first intellectual property asset, the first intellectual property right created by a grant of less than all of the rights in the first intellectual property asset in exchange for a stream of payments. The patent investment entity further includes at least one equity interest in the patent investment entity, the interest configured to represent an interest in income generated by the intellectual property grouping and an income distribution system, the system configured to distribute income generated by the intellectual property grouping.

Yet another exemplary embodiment relates to a method of structuring a transaction to acquire an intellectual property asset including an intellectual property right. The method includes acquiring a first portion of the intellectual property right from a seller in exchange for the fair market value of the first portion, acquiring a second portion of the intellectual property right from a seller in exchange for an equity interest in a patent investment entity, leasing the first portion of the intellectual property right to the seller for a predefined lease term, and utilizing the second portion of the intellectual property right as a source of income for the patent investment entity.

Yet another exemplary embodiment relates to a method of structuring a transaction to acquire an intellectual property asset including an intellectual property right. The method includes acquiring a first portion of the intellectual property right from a seller in exchange for the fair market value of the first portion, acquiring a second portion of the intellectual property right from a seller in exchange for an equity interest in a patent investment entity, leasing the first portion of the intellectual property right to the seller for a predefined lease term, and utilizing the second portion of the intellectual property right in combination with at least one second portion from at least one second intellectual property asset as a source of income for the patent investment entity.

DETAILED DESCRIPTION OF SOME EMBODIMENTS

Figure 1:
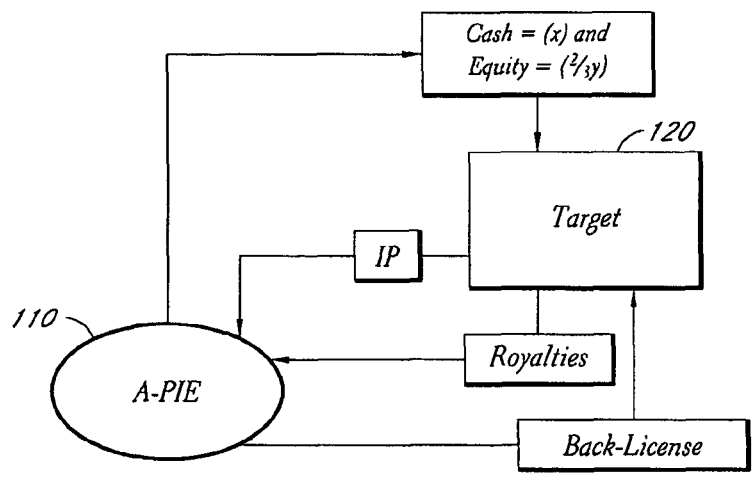
FIG. 1 is a block diagram illustrates a system and method for monetizing and/or securitizing intellectual property using a patent investment entity including acquired intellectual property assets according to an exemplary embodiment.

Referring now to FIG. 1, a block diagram 100 illustrates a system and method for monetizing and/or securitizing intellectual property using a patent investment entity including acquired intellectual property ("IP") assets according to an exemplary embodiment. Block diagram 100 includes a patent investment entity 110 and a target entity 120 owning one or more IP assets.

Target entity 120 may be any type of entity owning or owning rights in one or more IP assets. For example, target entity 120 may be a corporation, a partnership, an individual, etc.

The ownership of the one or more IP assets may be ownership based on creation, for example where a person within target entity 120 creates an invention and obtains a patent directed to the invention or creates an original work and obtains a copyright. Alternatively, ownership may be the result of an acquisition of an IP asset originally owned by another entity. Further, ownership may be based on an acquisition by licensing of an IP asset owned by another. Yet further, the ownership may be ownership in whole or in part.

Ownership of an IP asset can include any type of ownership that confers the right to exercise one or more IP rights associated with the IP asset. Examples of IP assets may include patents, copyrights, trade secrets, trademarks, etc.

IP rights can include any right associated with an IP asset. An IP right may be conferred by statute, case law, practice in the industry, inherent properties, etc. An IP right may further include the right to perform an action and/or prevent another party from performing an action. For example, patents entitle the owner to exclude others from importing, making, using, selling, or offering to sell the invention covered by the patent. Further, copyrights provide an author the right to control reproduction of his intellectual creation, such as literary works, musical works, dramatic works, pictorial works, motion pictures, sound recordings and architectural works, along with the right to make derivative works.

According to an exemplary embodiment, and based on the nature of IP rights, it is often possible to split an IP right into one or more portions of the IP right. For example, as stated above, a patent generally includes a right to exclude others from practicing the invention. Inherent in the right to exclude is the right to license particular entities to practice the invention, usually in return for compensation, such as licensing fees. Further, different type of licenses may be granted such as an exclusive license, a non-exclusive license, an exclusive license within a defined field of use, etc. Whenever the license is other than an exclusive license to all fields of use for the entire economic life of the underlying IP asset, residual rights in the IP asset are created and licenses based on the residual rights may be granted to additional entities. Each portion of the IP right includes a right under the IP asset that is less than all of the rights afforded by the "P asset.

Target entity 120 may be configured such that the entity is only utilizing a first portion of the IP rights afforded under an IP asset. For example, when a target entity 120 is a vehicle manufacturer and owns a patent directed to a method of spray painting, the vehicle manufacturer may only be utilizing the patented method of spray painting as applied to vehicles. Accordingly, the first portion of the IP right is a right to exclude others from using the method of spray painting to spray paint vehicles. The first portion may be either an exclusive or a non-exclusive right. The first portion may further be a right to use the subject matter of the IP asset.

However, the patent right also includes at least a second portion of the IP right, which may include, continuing with the earlier example, the method of spray painting as applied to houses. The at least second portion may be referred to as a residual portion. The residual portion may not be utilized by the vehicle manufacturer because they have no interest in preventing others from using this method to spray paint houses. The IP right residual portions may include numerous residual portion delineated by field of use, term of use, geographic location of use, etc.

The residual portion of the IP right, although not valuable to the target entity 120 in its present business, may be valuable to another entity in a different business, such as house painting. Accordingly, the house painting entity may desire to license the residual portion or any portion thereof of the IP right. Further, there may be infringers of the residual portion of the IP right. It may be possible to obtain reasonable royalties based on the infringing use by the infringers.

However, target entity 120 may not possess the resources or knowledge required to capture the potential income that may be generated based on the residual portion of the IP right. For example, patent litigation is a costly venture and a relatively small target entity may not have the resources to pursue this course of action, especially against an entity that is not a competitor. Further, licensing revenue can only be generated if the target entity 120 is able to identify potential licensees. Identifying potential licensees may require in depth analysis of IP rights and markets where the IP rights may be of value. This type of analysis may require a diverse and specialized knowledge base.

Accordingly, target entity 120 may enter into a transaction wherein target entity 120 is able to continue to utilize the first portion of the IP right and also capture the additional income potential of the residual portion of the IP right. The transaction may include the sale of IP assets from the target entity 120 to patent investment entity 110, and the subsequent transfer of just the first portion of the IP rights back from patent investment entity 110 to the target entity 120.

In order to begin the process, at least one IP asset must be identified. Generally, an owner that wishes to securitize some portion of its IP portfolio will identify all IP assets it owns, and determine which ones it wishes to have analyzed for securitization and/or monetization. Often, the owner will want to securitize all the IP assets it owns that relate to a particular product line or business activity. The IP portfolio may even contain IP assets owned by third parties, so long as the owner seeking securitization and/or monetization has exclusive rights in such third party IP assets, and the right to convey such exclusive rights to others.

Once a particular IP portfolio is identified, its current value must be determined to an acceptable degree of accuracy for purposes of securitization and/or monetization, further described below. The number of different approaches to determining value of the IP estate is virtually limitless, and different methods will produce different estimated values. One method, described below, is described in U.S. patent application No. 20010042034, filed Jan. 11, 2001.

To effectively securitize and/or monetize an IP asset, an economically reasonable estimate of the current value of the IP must be obtained as described above. Further, the ability to demonstrate to a current owner the value of an IP for which the owner is seeking securitization is useful. While numerous methods of estimating the value of one or more intellectual properties are known, the invention disclosed herein includes a method of combining an estimate of the value of an IP with an assessment of the impact on the value of the selling business of securitizing and/or monetizing that IP. This method comprises entering information related to at least one IP, calculating a value of the at least one IP using a first valuation algorithm, selecting a second valuation algorithm having a plurality of inputs, inputting the value of at least one IP into the second valuation algorithm, inputting at least one additional piece of information required by the second valuation algorithm, and calculating the change in value to the owner of the IP using the second valuation algorithm. The method may further comprise inputting an identifier indicative of a utility of the IP by selecting from a list including such options as: "new product category," "improvement on an existing product," "a new process," "an improvement on an existing process," and "regulatory compliance." The method may further comprise selecting a first valuation algorithm from a plurality of valuation algorithms by selecting a first valuation algorithm particular to the type of utility associated with the IP. The method may further comprise entering information on the financial characteristics of the owner not directly related to the IP asset.

Typical information used for the valuation method of this invention includes, but is not limited to: current and projected future revenues and costs of the goods covered by the IP asset, cost savings attributable to an invention covered by an IP asset, the book value of the business activities associated with the IP asset, and ongoing expenditures for marketing, research and development. It is difficult to calculate a value for an IP asset not associated with any current or ongoing revenue or costs.

The particular valuation algorithm will necessarily determine what information must be obtained and entered for the valuation to be completed. For example, when making a valuation for an environmental control invention that permits a business to continue operation under regulatory requirements, the evaluation should take into consideration the ongoing revenue generated by the continuation of the business. In addition to financial information, information such as the remaining life of the patent may be used by the first valuation algorithm.

Once the appropriate first valuation algorithm has been determined for each IP asset within a portfolio, the current value of the portfolio is determined using the appropriate algorithms.

Determining whether an owner should securitize or monetize its selected IP portfolio, or a portion thereof, will depend on a number of factors in addition to the estimated value of the IP portfolio. Therefore, the second valuation algorithm may have at least one other input in addition to the valuation of the IP portfolio obtained from the first algorithm. For example, an owner typically will not securitize or monetize its IP portfolio if the original owner is required to make a future payment stream to a third party that is greater than the owner's return on equity or the monetization would result in a loss. Therefore, in addition to determining the current value of the IP portfolio, the change in value to the original owner of the IP portfolio may be considered when selecting a second valuation algorithm.

The current value of the IP portfolio may be used as a starting point to determine the value at which the portfolio is securitized. Therefore, the estimated current value is used by a second valuation algorithm.

Once the appropriate second valuation algorithm is selected, the appropriate information is collected and entered. For example, securitization or monetization may involve an exchange of the IP portfolio for compensation, such as a lump sum payment, a stream of income, a contractual right, an equity interest, etc., to the original owner. The future value to the original owner of the net proceeds of the compensation may also be considered in the second valuation algorithm. One measure of the future value of the net proceeds of the compensation to the original owner is the current return on equity. Other measures, such as money market rates or the prime rate, may also be used.

The second valuation algorithm may determine the change in value to the original owner if the IP portfolio is securitized and/or monetized, versus the value to the original owner if the portfolio is not securitized and/or monetized. This outcome will be used to decide whether to securitize or monetize the IP portfolio. If the value is positive, the business will show an increase in value in that amount if the IP portfolio is securitized and/or monetized. Once a positive change in the value of the business based on this calculation has been determined, the IP portfolio will probably be securitized and/or monetized for an amount related to, but not identical to, the estimated current value. For example, if the estimated current value is $370,180,000, the portfolio may be securitized on monetized for $350,000,000, $370,000,000, or other amounts in a similar or lesser range, but would probably not be securitized and/or monetized for an amount of $500,000,000.

The valuation is utilized in the acquisition of the IP assets by patent investment entity 110. Patent investment entity 110 may be any type of entity, such as a corporation, a partnership, etc. Patent investment entity 110 is configured to acquire IP assets from target entity 120. Patent investment entity 110 may further be configured such that equity interests in patent investment entity 110 may be issued. The equity interests may be based, at least in part, on the income generated by patent investment entity 110 in the securitization and/or monetization of the acquired IP assets acquired by patent investment entity 110. Although generation of income is described, a loss may occur within the generation of income.

According to an exemplary embodiment, as shown in FIG. 1, IP assets may be acquired by patent investment entity 110 from target entity 120 in exchange for some type of compensation, such as cash payments, contractual rights, equity interests in patent investment entity 110, etc. According to an exemplary embodiment, the acquisition of an IP asset by patent investment entity 110 from target entity 120 may be associated with a cash payment from patent investment entity 110 to target entity 120 based on the fair market value of the first portion of the IP right and an equity interest payment based on a percentage of the fair market value of the residual portion of the IP right. The percentage of the fair market value for the residual portion of the IP right may be a negotiated value determined to compensate target entity 110 for providing the residual portion of the IP right.

In some embodiments, the target entity 120 makes representations and warranties regarding the contributed IP. For example, the target entity may represent that full disclosure regarding the IP has occurred. In one embodiment, the target entity 120 will disclose if the Contributed IP is or has been subject to any interference, cancellation or other protest proceeding or any other challenge to its validity or the patentability of the art reflected therein, in the United States or otherwise, or whether or not such proceedings have, to the best knowledge of target entity 120, been threatened. In some embodiments, the target entity 120 represents and warrants that it is the sole owner of the Contributed IP. This may include terms that each inventor of the inventions covered by the Contributed IP, other than the target entity 120, has assigned all their right, title and interest in the Contributed IP to the target entity 120 by a valid and enforceable assignment. In some embodiments the target entity 120 might also warrant that no other person has a lien, encumbrance or other interest in any of the patents or other IP other than the holders of existing licenses. The existing licenses, if any exist, may be specified in an exhibit attached to the relevant agreement. The target entity 120 may also agree to provide certified copies of recorded assignments of the Contributed IP.

The target entity 120 may agree to disclose any known or potential infringement of any Contributed IP by any third party to the best knowledge of the target entity 120. Another possible provision(s) is for the target entity 120 to warrant and represent that: the Contributed IP has been validly issued by the Commissioner of Patents and Trademarks of the United States or by similar authority in the jurisdiction of issuance; each inventor of the inventions covered by the Contributed IP was properly named as an inventor, and no other persons were so named; all fees, maintenance fees and filings required to be submitted to the United States Patent and Trademark Office (the "USPTO") or similar office outside the United States have been made and all administrative obligations thereto have been satisfied. The target entity 120 may also warrant that it currently uses or plans to use some or all of the technology rights or other IP contained within the Contributed IP.

Following the transfer of ownership of the IP assets to patent investment entity 110, patent investment entity 110 may lease the first portion of the IP right back to target entity 110 such that target entity 110 may continue to exercise the right afforded by the first portion. Generally, the lease will allow target entity 110 to exercise the IP right for the duration of a lease term associated with the lease. In order to qualify as a true lease, the lease may be structured such that the value of the first portion of the IP right at the end of the lease term is at least 20% of the economic value of the first portion of the IP right at the beginning of lease term. One way to accomplish this is to limit the duration of the lease term to no more than eighty percent of the remaining economic life of the IP asset at the beginning of the lease.

In addition, wherein the patent investment entity 110 owns second portions from at least one additional IP asset, as will be further described below, patent investment entity may lease a right based on some or all of the second portions from the at least one additional IP asset, as well as the second portion for the IP asset obtained from the seller.

Figure 2:
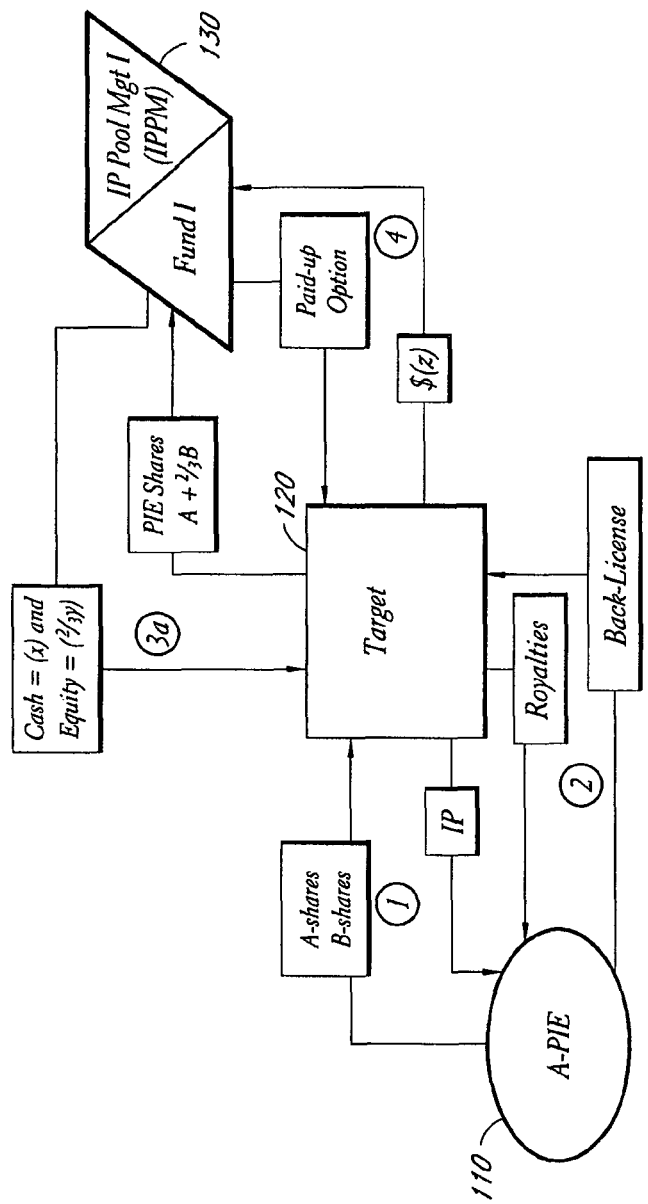
FIG. 2 is a block diagram illustrating a system and method for monetizing and/or securitizing intellectual property using a patent investment entity including acquired intellectual property assets according to an alternative embodiment.

According to alternative embodiments, the acquisition of the IP assets by patent investment entity 110 from target entity 120 may be structured according to any other method that results in the acquisition of the IP asset by patent entity 120. For example, as shown in FIG. 2, transfer of the IP asset can include the transfer of equity in patent investment entity 110 to a fund entity 130 through target entity 120. Advantageously, different structures and/or entities may be utilized to facilitate financing, tax treatment, debt structure, distribution of income, etc.

According to an exemplary embodiment, patent investment entity 110 may securitize or monetize the IP asset. Securitization and/or monetization may include: selling of equity interests in the patent investment entity 110; utilizing acquired IP assets to generate a stream of income, for example through licensing, royalties, litigation, etc.; and allocating payments from the income stream to more than one investor, in varying proportions dependent on the investors equity interest.

The method of allocating payments to each one of multiple investors includes the steps of: (a) creating and identifying investor accounts, (b) obtaining an initial amount from an investor in exchange for an assignable agreement to allocate a proportionate amount of future income to the investors, (c) associating the initial amount from an investor with that investor's account, (d) for each IP asset to be securitized, identifying the initial owner of the IP asset, (e) paying an amount to the initial owner of the IP asset upon the transfer of title to the IP asset from the initial owner to one or more subsequent owners, (f) leasing a license to the initial owner and/or other entities for the use of the invention covered by the IP asset from the subsequent owner(s) in exchange for an agreement by the initial owner and/or other entity to make at least one payment in a predetermined amount at a specified time for the grant of such license, wherein the licenses can be of varying scope as to rights granted or fields of use, (g) obtaining at least one lease payment from the licensee(s) of the IP asset, (h) placing the at least one lease payment into fund 130 established for the purpose of receiving such funds, and (i) allocating the at least one lease payment from fund 130 to the respective investor account(s) in correct proportions.

The method may also be applied in the situation where a particular IP asset is already licensed to a user other than the owner prior to securitization of the IP asset. In such case, the IP asset may be acquired from the current owner, subject to the existing license obligation, so long as the existing license is consistent with the method disclosed herein. Alternatively, the method described herein may be applied independently of such license, so long as the license back to the initial owner is broad enough to encompass the existing license. Thus, the method would not be directly applicable in the situation where an IP asset owner had granted an exclusive license of all the rights granted by the IP asset unless the licensee also participated and agreed to enter a new license in accordance with the method disclosed herein.

Although the method can be applied in the situation where there is only one investor, a more typical situation will involve multiple investors. In that situation, each investor has a separate account and can separately sell their interest, or a portion thereof, to subsequent investors or redeem their interest or a portion thereof for cash payments. Therefore, the system must be able to create and track multiple investor accounts.

To permit the management of a portfolio of securitized patents with the ability to include new investors and permit existing investors to transfer or withdraw their interests, a computer system may be necessary. The system must be capable of handling multiple IP portfolios, multiple investor accounts, and the numerous transactions whereby investor interests in the various IP portfolios are made, changed, or terminated. Additionally, the system must be capable of handling repeated securitization and/or monetization of multiple IP assets and facilitate investments that are not time-dependent upon or specifically tied to individual underlying securitizing and/or monetization transactions.

Specifically, a system which permits the collection of investments from multiple investors, the real-time continuous evaluation of the value of the underlying IP assets, and which permits individual investors to increase their investment or to withdraw invested funds without requiring the underlying transaction to occur simultaneously with such change in investment is desirable for the ready securitization of IP assets.

Such a system may have the following general attributes, not all of which are essential: it would involve more than one underlying IP asset securitizing or monetizing transaction; it would permit one or more investors to invest funds in the system, where such investment was not associated with any particular IP asset securitizing or monetizing transaction; it would include the availability of funds not invested in IP assets for cash withdrawal, if needed; it would permit the securitizing and/or monetizing of additional IP assets using existing investment funds, rather than requiring additional investment for the new IP to be securitized and/or monetized; it would permit each individual investor's current investment to be evaluated on a regular basis; and would permit individual investors to withdraw funds independent of securitizing or monetizing transactions.

The computer system may be further configured to manage and/or implement the functionality described herein as being performed by patent investment entity 110. For example, the system may include an income distribution system configured to manage the distribution of income generated by the residual rights.

In some embodiments, the some or all of the Contributed IP is back licensed to the IP source entity (the "Back-License Agreement"). In some embodiments, the obligation to form the Back-License Agreement is set out in the agreement that transfers the Contributed IP to the patent investment entity 110. In other embodiments, the Back-License Agreement is created as part of and/or at the same time the agreement that transfers the Contributed IP to the patent investment entity 110. The Back-License Agreement could also be created after the agreement that transfers the Contributed IP to the patent investment entity 110.

In some embodiments, the patent investment entity sells a preferred membership interest to a third party investor (the "Preferred Member") in exchange for an agreed upon capital contribution. Preferably, the Preferred Member(s) is entitled to returns based on the value of the IP held by patent investment entity 110 and the royalties thereon (the "Preferred Membership Interest"). In an alternative embodiment, the Preferred Membership Interest may be stratified into two or more classes (e.g., junior and senior preferred).

Preferably, the Preferred Membership Interest has a final maturity term and pays a periodic preference. In some embodiments, the periodic preference is calculated multiplying (i) the royalty rate as determined by the appraiser times (ii) a multiple (X) determined by mutual agreement of the parties to the transaction. For example, the final maturity term could be 10 years, the periodic preference could be quarterly and the multiple (X) could be 1. In some embodiments, the amount of preference may be re-calculated each time the IP held by the patent investment entity 110 is re-evaluated pursuant to periodic appraisals established by agreement. In some embodiments, the preference shall be cumulative, with accrued and unpaid preference amounts carrying over to the next payment period. Preferably, no payments or distributions may be made with respect to obligations junior to the Preferred Membership Interests, including but not limited to the Common Membership Interests until the Preferred Membership Interest has been made current. One embodiment provides the Preferred Membership Interest to be non-voting, but it is contemplated that a default situation may modify these rights.

In some embodiments, the Preferred Member may have the right but not the obligation to put the Preferred Membership Interest to the patent investment entity 110 at its then-current value at any time after a pre-defined period after the closing date if the periodic appraisal determines that the total value of the IP has dropped to or below a pre-defined percentage less than its original value. For example, the pre-defined period could be 5 years from the closing date and the pre-defined percentage could be 80%. In some embodiments, the patent investment entity in turn shall have the right but not the obligation to call the Preferred Membership Interest at its then-current value at any time after a pre-defined period after the closing date if the periodic appraisal shall have determined that the total value of the IP has risen to or above a pre-defined percentage of its original value. For example, the pre-defined period could be 5 years from the closing date and the pre-defined percentage could be 80%.

In another embodiment, the patent investment entity borrows an agreed upon amount from a Lender pursuant to a senior credit facility (the "Credit Facility") and incurs interest at pre-defined periods (e.g., quarterly) at a pre-defined rate (e.g., LIBOR plus [X] bps per annum). Preferably, the Credit Facility shall be a term financing and has a pre-defined final maturity date (e.g., 5 years from the date of borrowing). Preferably, the patent investment entity 110 makes periodic payments (e.g., quarterly) in arrears. In some embodiments, the patent investment entity 110 shall have no right to re-borrow funds that have been repaid. Preferably, the amount of principal amortization prior to maturity is mutually agreed upon between the patent investment entity 110 and the creditors (in this capacity, "Lender"). The loan can either be fixed rate or floating rate.

Preferably, the base rate and spread (in the case of floating rate) or the interest rate (in the case of fixed rate) are mutually agreed in advance by the Lender and patent investment entity 110. Preferably, upon exercise of the call and/or put options with respect to the Preferred Membership Interest, the Facility will become immediately due and payable. In one embodiment of the invention, the Lender(s) has a first priority interest in the cash flows of the patent investment entity 110. In one embodiment, the Preferred Member(s) has a first priority interest in the IP owned by patent investment entity.

Figure 3:
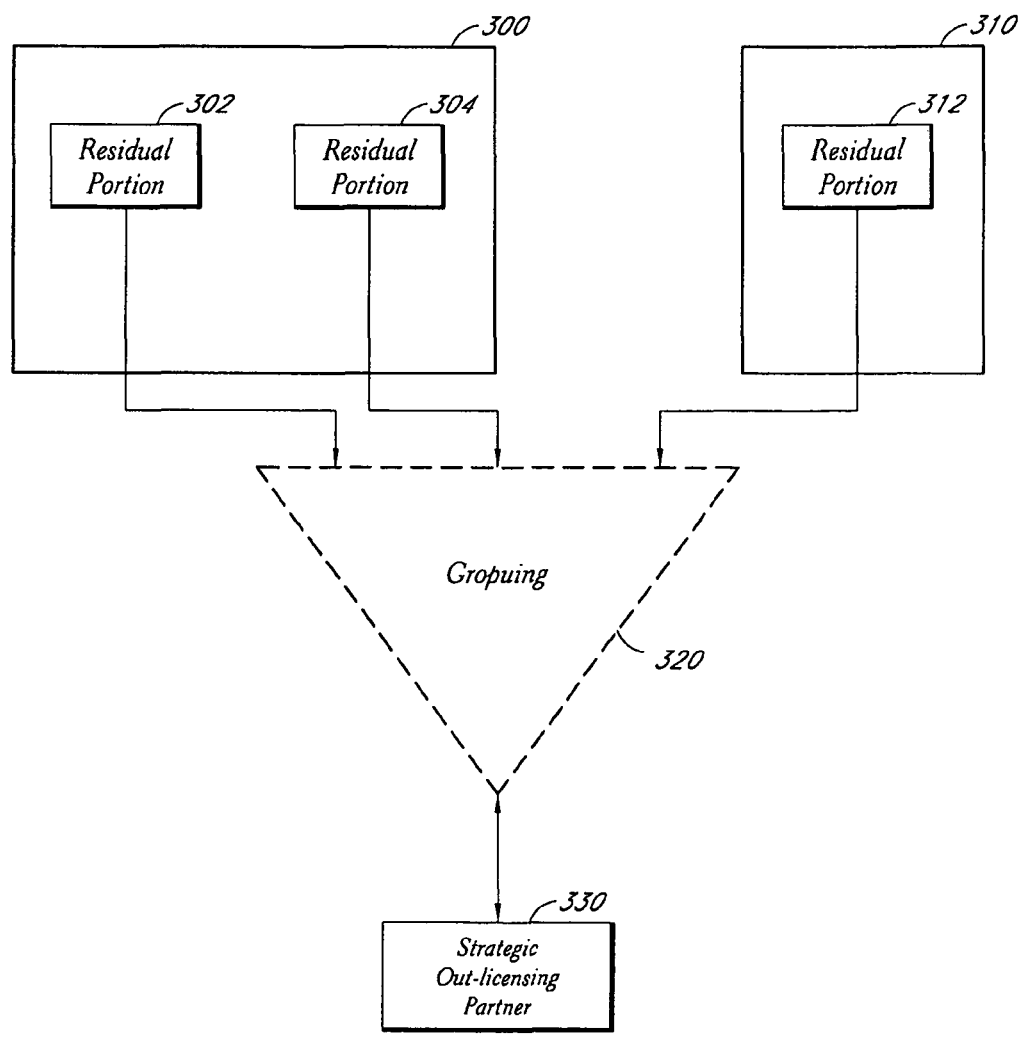
FIG. 3 is a block diagram illustrating a system and method for grouping intellectual property rights according to an exemplary embodiment.

Referring now to FIG. 3, a block diagram illustrates entity involved in the creation of a grouping of IP rights. The grouping may involve the contribution of IP rights from one or more entities.

For example, FIG. 3 shows the a first patent investment entity 300 contributing a first residual right 302 and a second residual right 304 to a grouping 320. One or more entities may contribute IP rights to grouping 320. Second patent investment entity 310 contributes a third residual right 312 to grouping 320. Each patent grouping may be associated with a specific strategic out-licensing partner 330, as further described below.

The residual portion of IP rights obtained from target entity 120, shown in FIG. 1, may further be grouped with other residual portions acquired from the acquisition of other IP assets. According to an exemplary embodiment, grouping may include acquiring multiple residual portions of an IP right within a single patent investment entity 110. The grouping may further rights contributed from other sources, such as a target entity 120.

Advantageously, the grouping of residual portions of IP rights 320 allows the patent investment entity 110 to create value from of the residual portions that would otherwise be wasted. The residual portions may be acquired based on at least one common characteristic of the residual portions. The common characteristic may include a technology area, a typical usage, a specific industry, etc.

Grouping of patent rights may facilitate economies of scale in the exercise of patent rights. For example, patent investment entity 110 is specifically configured for the exercise of patent rights. Accordingly, the patent investment entity 110 may have greater resources and/or more experience to obtain income based on the residual rights. Income may be obtained in the identification of potential licensees, pursuit of litigation against infringers, etc.

Additionally, the grouping 320 may be further structured such that any entity that provided an IP asset used in the grouping may be entitled to avoid infringement when practicing according to any other IP asset in the grouping. This benefit may be provided through licenses, covenants not to sue, etc.

For example, multiple residual portions may be grouped related to a single technology to strengthen a licensing bargaining position of the patent investment entity 110. When approaching a potential licensee, it may be advantageous be able to offer licenses to multiple residual portions within the potential licensee's field of operations. Advantageously, obtaining a single license has the effect of streamlining infringement avoidance for the potential licensee.

Grouping residual portions of IP rights may further facilitate recognition of additional opportunities to obtain IP assets. For example, it may be possible to identify a new IP asset based on the grouping of the residual portions and to obtain the IP asset based on the identification. For example, where the claims of two patents, viewed in concert, define a gap and identify a novel concept, a new patent application, or bridge patent, may be filed based on the novel concept.

Further each group may be associated with strategic out-licensing partner 330. Each strategic out licensing partner 330 may be specifically experienced in the area of technology or focus of the group of residual portions. Advantageously, the strategic out-licensing partners 330 may be experienced in the industry and in IP to facilitate identification of potential licensees, identification of bridge patent opportunities, etc.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless indicated otherwise, it may be assumed that the process steps described herein are implemented within software modules (computer programs) that are executed by one or more general purpose computers, and that these steps are performed automatically (i.e., without human intervention). The software modules may be stored on or within any suitable computer storage device. It should be understood that the various steps may alternatively be implemented in-whole or in-part within specially designed hardware.

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

The disclosed features may be implemented in various environments, including computer-based environments, such as personal computers, workstations, servers, laptops, personal digital assistants (PDAs), mobile phones, handheld devices, and other computing devices, workstation, networked and other computing-based environments with one or more customers. The present invention, however, is not limited to such examples and embodiments of the invention may be implemented with other platforms and in other environments.

By way of example, some embodiments of the invention may be implemented using conventional personal computers (PCs), desktops, hand-held devices, multiprocessor computers, pen computers, microprocessor-based or programmable customer electronics devices, minicomputers, mainframe computers, personal mobile computing devices, mobile phones, portable or stationary personal computers, palmtop computers or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Some embodiments of the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of utilizing an intellectual property grouping owned by a patent entity to generate income, the method comprising:
   implementing acquisition of rights in a first intellectual property asset from a seller on behalf of a patent investment entity, wherein the implementing is managed by a computer system comprising one or more computer processors;
   providing compensation to the seller in exchange for the first intellectual property asset;
   determining a division of rights in the first intellectual property asset into a first portion and a second portion, the first portion comprising less than all of the rights in the first intellectual property asset that are being utilized by the seller, the second portion comprising the remaining rights reflecting residual rights in the first intellectual property asset that are not being utilized by the seller;
   managing, by the computer system, a granting back, on behalf of the patent investment entity, of the first portion to the seller of the intellectual property asset in exchange for a stream of payments; and
   managing, by the computer system, utilization of the second portion by licensing the second portion to a licensing entity to generate income for the patent investment entity, wherein the licensing entity is different than the patent investment entity and the seller.

2. The method of claim 1, wherein providing compensation to the seller in exchange for the first intellectual property asset includes acquiring all substantial rights of value in the first intellectual property asset.

3. The method of claim 1, further including providing compensation to the seller in exchange for at least a second intellectual property asset and grouping residual rights from the second intellectual property asset with the residual rights in the first intellectual property asset.

4. The method of claim 1, wherein providing compensation to the seller in exchange for the first intellectual property asset includes providing an interest in the patent investment entity.

5. The method of claim 4, further including distributing the generated income based upon the interests in the patent investment entity.

6. The method of claim 1, wherein providing compensation to the seller in exchange for the first intellectual property asset includes providing a cash equivalent to a fair market value of the intellectual property asset.

7. The method of claim 1, further including analyzing the residual rights in the first intellectual property asset to identify a new intellectual property asset.

8. The method of claim 7, wherein the common characteristic is a field of technology.

9. The method of claim 1, wherein the residual rights in the first intellectual property asset are grouped according to at least one common characteristic.

10. The method of claim 1, further including offering an equity interest in the patent investment entity to at least one third party.

11. The method of claim 1, wherein granting less than all of the rights in the first intellectual property asset comprises leasing less than all of the rights in the first intellectual property asset to the seller for a predefined lease term, whereby the predefined lease term is a term defined to be based on 80% of the economic life of the first intellectual property asset.

12. A method of utilizing an intellectual property grouping owned by a patent entity to generate income, the method comprising:
   implementing acquisition of rights in first and second intellectual property assets from at least one seller on behalf of a patent investment entity, wherein the implementing is managed by a computer system comprising one or more processors;
   providing compensation to each of the at least one seller in exchange for the first and second intellectual property assets;
   granting back, on behalf of the patent investment entity, less than all of the rights in the first intellectual property asset to the at least one seller of the first and second intellectual property assets in exchange for a stream of payments, wherein granting less than all of the rights in the first and second intellectual property assets leaves first and second residual rights in the first and second intellectual property assets, respectively; and managing, by the computer system, utilization of the first and second residual rights in the first and second intellectual property assets to generate income for the patent investment entity.

13. The method of claim 12, wherein providing compensation to the seller in exchange for the first and second intellectual property assets includes acquiring all rights of value in the first and second intellectual property assets.

14. The method of claim 12, further including providing compensation to the seller in exchange for at least a third intellectual property asset, and grouping residual rights from the third intellectual property asset with the first and second residual rights.

15. The method of claim 12, wherein providing compensation to the at least one seller in exchange for the first and second intellectual property assets includes providing an interest in the patent investment entity to each seller.

16. The method of claim 15, further including distributing the generated income based upon the interests in the patent investment entity.

17. The method of claim 12, wherein providing compensation to the seller in exchange for the first and second intellectual property assets includes providing cash equivalent to the fair market value of the first and second intellectual property assets.

18. The method of claim 12, further including analyzing the first and second residual rights in the first and second intellectual property assets to identify a new intellectual property asset.

19. The method of claim 12, wherein the first and second residual rights in the first and second intellectual property assets are grouped according to at least one common characteristic.

20. The method of claim 19, wherein the common characteristic is a field of technology.

21. The method of claim 12, further including offering an equity interest in the patent investment entity to at least one third party.

22. The method of claim 12, wherein granting less than all of the rights in the first and second intellectual property assets comprises leasing less than all of the rights in the first and second intellectual property assets to the sellers of the first and second intellectual property assets for a predefined lease term, whereby the predefined lease term is a term defined to be based on 80% of the economic life of the first and second intellectual property assets.

23. A patent investment entity system configured to manage an intellectual property grouping to generate income, the system comprising:

an intellectual property grouping system that comprises one or more computer processors and maintains information about at least one residual right in a first intellectual property asset, the first intellectual property right created by a grant of less than all of the rights in the first intellectual property asset in exchange for a stream of payments;

data, stored by the patent investment entity system, that indicates at least one equity interest in the patent investment entity, wherein the interest is configured to represent an interest in income generated by the intellectual property grouping; and an income distribution system configured to manage distribution of income generated by the intellectual property grouping.

24. The patent investment entity system of claim 23, wherein the intellectual property grouping system further includes data indicating at least a residual right from a second intellectual property asset with the residual right in the first intellectual property asset.

25. The patent investment entity system of claim 23, wherein the intellectual property grouping system comprises data indicating an exchange of at least one equity interest for the first intellectual property asset.

26. The patent investment entity system of claim 25, further including a distribution system configured to control distribution of the generated income based upon the equity interests in the patent investment entity.

27. A system comprising:

a computer system, said computer system programmed, via executable code, to implement a method that comprises:

implementing acquisition of rights in a first intellectual property asset from a seller on behalf of a patent investment entity, wherein the implementing is managed by a computer system;

providing compensation to the seller in exchange for the first intellectual property asset;

granting back, on behalf of the patent investment entity, less than all of the rights in the first intellectual property asset to the seller of the intellectual property asset in exchange for a stream of payments, wherein granting less than all of the rights in the first intellectual property asset leaves residual rights in the first intellectual property asset; and utilizing by licensing the residual rights in the first intellectual property asset to generate income for the patent investment entity.

28. The system of claim 27, wherein providing compensation to the seller in exchange for the first intellectual property asset includes acquiring all substantial rights of value in the first intellectual property asset.

29. The system of claim 27, wherein providing compensation to the seller in exchange for the first intellectual property asset includes providing an interest in the patent investment entity.

30. Non-transitory computer storage having stored thereon executable program instructions that direct a computing system to manage a process that comprises:

implementing acquisition of rights in a first intellectual property asset from a seller on behalf of a patent investment entity, wherein the implementing is managed by a computer system;

providing compensation to the seller in exchange for the first intellectual property asset;

granting back, on behalf of the patent investment entity, less than all of the rights in the first intellectual property asset to the seller of the intellectual property asset in exchange for a stream of payments, wherein granting less than all of the rights in the first intellectual property asset leaves residual rights in the first intellectual property asset; and utilizing by licensing the residual rights in the first intellectual property asset to generate income for the patent investment entity.

31. The non-transitory computer storage of claim 30, wherein providing compensation to the seller in exchange for the first intellectual property asset includes acquiring all substantial rights of value in the first intellectual property asset.

32. The non-transitory computer storage of claim 30, wherein providing compensation to the seller in exchange for the first intellectual property asset includes providing an interest in the patent investment entity.

33. A method for financing an intellectual property holding company comprising:
- electronically receiving in a computer a representation and warranty made from an intellectual property source entity to a separate intellectual property holding company, wherein the intellectual property source entity represents and warrants in the representation and warranty that the intellectual property source entity is the sole owner of intellectual property assets;
- electronically assigning ownership or title in the intellectual property assets from the intellectual property source entity to the separate intellectual property holding company, wherein the intellectual property source entity operates in a field of use;
- electronically generating a back-licensing agreement in a computer, wherein the separate intellectual property holding company licenses the intellectual property assets in the field of use to the intellectual property source entity;
- electronically storing in an electronic data repository the back-licensing agreement executed by the intellectual property source entity and the separate intellectual property holding company;
- electronically transferring back to the intellectual property source entity at least a portion of the ownership of the intellectual property holding company;
- electronically transferring equity in the intellectual property holding company from the intellectual property holding company to at least one third party investor; and
- electronically transferring investment capital from the at least one third party investor to the intellectual property holding company for the equity.

34. The method of claim 33, further comprising electronically generating a licensing agreement in a computer, wherein the intellectual property holding company licenses at least a portion of the intellectual property assets outside the field use to a third party licensee.

35. The method of claim 33 wherein the intellectual property holding company loans the investment capital to the intellectual property source entity and the intellectual property holding company receives an intercompany note from the intellectual property source entity in return.

36. The method of claim 33 wherein the equity is a preferred membership interest.

37. The method of claim 33 wherein the equity is a common interest.

38. The method of claim 33 wherein the equity is a lender interest.

39. The computer implemented method of claim 33 wherein there is more than one type of equity.

40. The method of claim 39 wherein the equity has different rights and obligations.

41. The method of claim 40 wherein the equity includes at least one of a common interest, a preferred interest, and a lender interest.

42. The method of claim 33 wherein the computer comprises a plurality of computers connected via network.

43. Non-transitory computer storage having stored thereon executable program instructions that direct a computing system to manage a process that comprises:
- receiving a representation and warranty made from an intellectual property source entity to an intellectual property holding company, wherein the intellectual property source entity represents and warrants in the representation and warranty that the intellectual property source entity is the sole owner of intellectual property assets;
- assigning ownership or title in the intellectual property assets from the intellectual property source entity to the intellectual property holding company, wherein the intellectual property source entity operates in a field of use;
- generating a back-licensing agreement, wherein the intellectual property holding company licenses the intellectual property assets in the field of use to the intellectual property source entity;
- storing in an electronic data repository the back-licensing agreement executed by the intellectual property source entity and the intellectual property holding company;
- transferring back to the intellectual property source entity at least a portion of the ownership of the intellectual property holding company;
- transferring equity in the intellectual property holding company from the intellectual property holding company to at least one third party investor; and
- transferring investment capital from the at least one third party investor to the intellectual property holding company for the equity.

44. The non-transitory computer storage of claim 43, the method further comprising generating a licensing agreement in a computer, wherein the intellectual property holding company licenses at least a portion of the intellectual property assets outside the field use to a third party licensee.

45. A system for financing an intellectual property holding company, the system comprising:
- a computer system; and
- a memory in communication with the computer system, wherein the memory stores a plurality of processing instructions for directing the computer system to perform a method that comprises:
  - receiving a representation and warranty made from an intellectual property source entity to an intellectual property holding company, wherein the intellectual property source entity represents and warrants in the representation and warranty that the intellectual property source entity is the sole owner of intellectual property assets;
  - assigning ownership or title in the intellectual property assets from the intellectual property source entity to the intellectual property holding company, wherein the intellectual property source entity operates in a field of use;
  - generating a back-licensing agreement, wherein the intellectual property holding company licenses the intellectual property assets in the field of use to the intellectual property source entity;
  - storing in an electronic data repository the back-licensing agreement executed by the intellectual property source entity and the intellectual property holding company;
  - transferring back to the intellectual property source entity at least a portion of the ownership of the intellectual property holding company;
  - transferring equity in the intellectual property holding company from the intellectual property holding company to at least one third party investor; and
  - transferring investment capital from the at least one third party investor to the intellectual property holding company for the equity.

46. The system of claim 45, the method further comprising generating a licensing agreement in a computer, wherein the intellectual property holding company licenses at least a portion of the intellectual property assets outside the field use to a third party licensee.

\* \* \* \* \*

UNITED STATES PATENT AND TRADEMARK OFFICE
CERTIFICATE OF CORRECTION

| | | |
|---|---|---|
| PATENT NO. | : 8,694,419 B2 | Page 1 of 1 |
| APPLICATION NO. | : 12/398836 | |
| DATED | : April 8, 2014 | |
| INVENTOR(S) | : Malackowski et al. | |

It is certified that error appears in the above-identified patent and that said Letters Patent is hereby corrected as shown below:

Title page (item 75, Inventors) line 3, Change "Chicaco, IL" for Andrew Carter to --Chicago, IL--.

Column 2 (title page 2, item 56) line 69, Under Other Publications, change "Psyochometrika," to --Psychometrika,--.

Column 1 (title page 3, item 56) line 10, Under Other Publications, change "Portofolios"," to --Portfolios",--.

Column 1 (title page 3, item 56) line 9, Under Other Publications, change "Techological" to --Technological--.

In the Drawings
       Sheet 3 of 3 (Reference Numeral 330, FIG. 3) at line 1, Change "Gropuing" to --Grouping--.

In the Specification
       Column 2 at line 57, Change "entity" to --entity.--.
       Column 11 at line 7, Change "the a" to --the--.

In the Claims
       Column 14 at line 21, In Claim 2, change "all substantial" to --all--.

Signed and Sealed this
Seventh Day of October, 2014

Michelle K. Lee
*Deputy Director of the United States Patent and Trademark Office*